Patented Oct. 21, 1924.

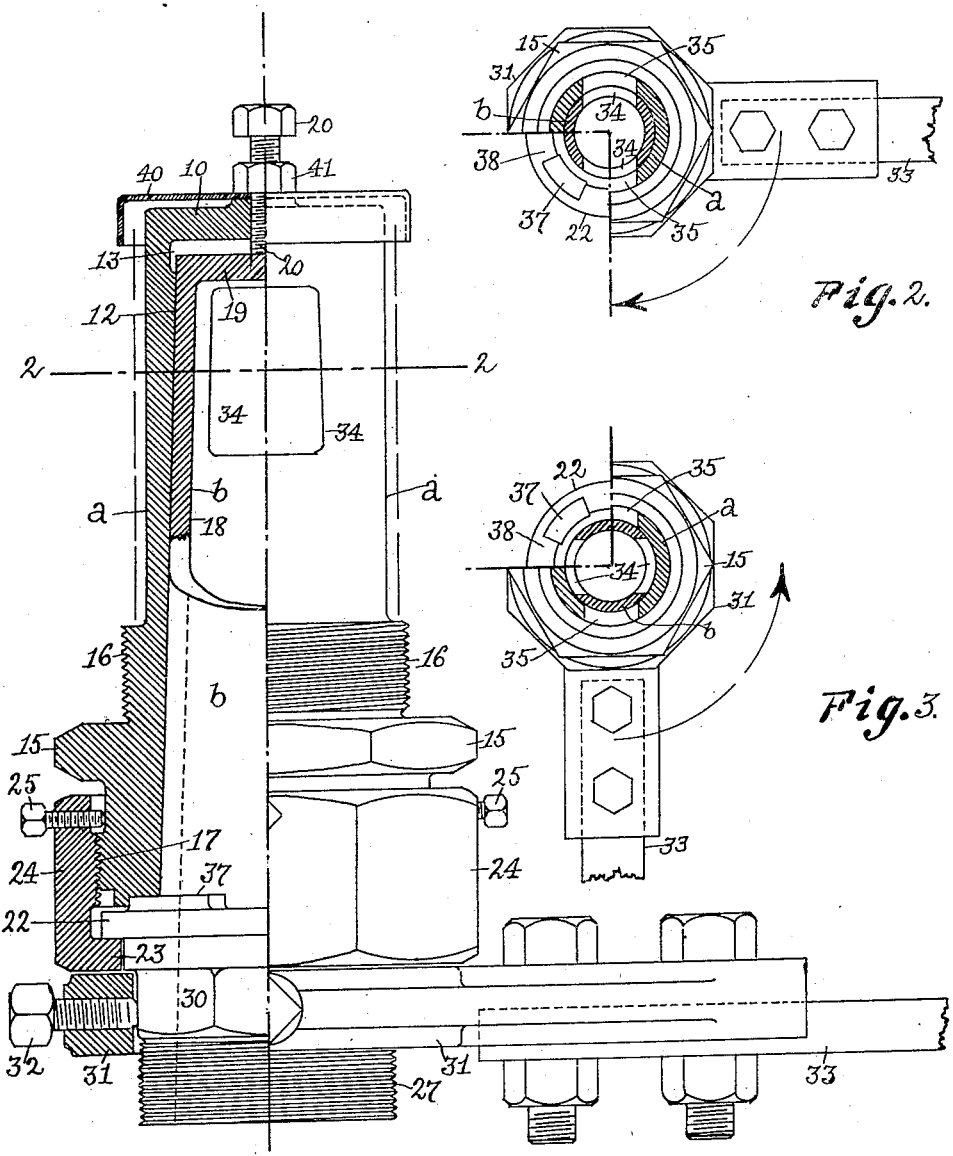

1,512,054

UNITED STATES PATENT OFFICE.

WILLIAM W. RONEY, OF SEWICKLEY, PENNSYLVANIA, ASSIGNOR TO H. H. ROBERTSON COMPANY, OF PITTSBURGH, PENNSYLVANIA, A CORPORATION OF PENNSYLVANIA.

VALVE.

Application filed October 7, 1920. Serial No. 415,422.

*To all whom it may concern:*

Be it known that I, WILLIAM W. RONEY, a citizen of the United States, residing in Sewickley, in the county of Allegheny and State of Pennsylvania, have invented an Improvement in Valves, of which the following description, in connection with the accompanying drawings, is a specification, like characters on the drawings representing like parts.

This invention relates to a valve and more particularly to a draw-off or outlet valve for tanks or vessels containing materials which are fluid when hot and solid or semi-solid when cold, such for instance as asphalt, bitumens or the like.

The invention has for its object to provide a draw-off valve of novel construction as will be described, which can be assembled and adjusted outside of the tank into a foolproof condition ready for use, and which when inserted into the tank remains proof against accidental derangement, said valve having provision for operating it from outside the tank, and for ensuring the positioning of the valve in its opened or closed position. The valve is further constructed so as to have a direct or axial outlet through its movable member or valve proper, which is capable of being removed from its stationary member or casing without removing the latter from the tank, and said movable member is constructed to enable it to be coupled with a discharge pipe if desired.

These and other features of this invention will be pointed out in the claims at the end of this specification.

Fig. 1 represents in section and elevation a valve embodying this invention.

Fig. 2 a section on the line 2—2, Fig. 1, showing the valve in its open position, and Fig. 3, a like section showing the valve in its closed position.

Referring to Fig. 1 *a* represents the stationary member or casing of the valve, and *b* the movable member or valve proper.

The stationary member *a* is made as a sleeve, which is open at its outer end and closed at its inner end by a head 10, and said sleeve is provided with a tapering bore 12, which extends from the outer end to near the head 10 and communicates with an enlargement 13 at said inner end.

The member *a* is also provided near its outer end with a flange 15 suitably shaped to be engaged by a monkey wrench, and on one side of said flange, the member *a* is provided with a screw-threaded portion 16 for engagement with a screw-threaded opening in the tank or vessel with which it is used and which is not herein shown.

The member *a* is further provided on the opposite side of the flange with a threaded portion 17 for a purpose as will be described.

The member *a* has inserted into it the member *b*, which is also made as a sleeve comprising an externally tapered body portion 18, which is open at one end and closed at its other end by the head 19, with which co-operates a set screw 20 carried by the head of the member *a*.

The set screw 20 acts as a stop to limit the movement of the member *b* into the member *a* and being adjustable, enables the tapered member *b* to be adjusted with relation to the tapered bore of the member *a* to avoid freezing of the parts together by the heat imparted to them by the hot contents of the tank, thereby ensuring proper operation of the valve under conditions of use. The member *b* is made of sufficient length to project beyond the open end of the member *a* and is provided with an external flange 22 with which co-operates the head 23 of a nut 24 to hold the member *b* in its proper or adjusted position in the member *a*. The nut 24 engages the threaded portion 17 of the member *a* and may be retained thereon by screws 25 which project above the upper end of the threaded portion 17 as clearly shown in Fig. 1.

The head 23 of the nut 24 is provided with an opening of sufficient size to enable the nut to be slipped over the outer end of the member *b* and cause the head to engage the flange 22.

The member *b* may and preferably will be provided at its outer end with external screw-threads 27 with which a pipe or hose not shown may be coupled with the member *b* when it is desired to discharge the contents of the tank or vessel at a point remote therefrom.

Provision is made for rotating the member *b* so as to open and close the same, and to this end, the member *b* is provided above the screw-threads 27 and below the flange 22 with a faceted portion 30 to be engaged by a wrench 31 herein shown as a spanner wrench, which may be permanently secured to the valve member *b* by one or more set screws 32, and which may be provided with a detachable handle 33. The movable valve member *b* is provided with one or more ports 34 herein shown as two in number and located diametrically opposite each other near the inner end of the same, and these ports co-operate with like ports 35 in the stationary member *a*, after the manner shown in Figs. 2 and 3.

Provision is made for limiting the rotary movement of the valve member *b* in opposite directions, so as to ensure that the ports 34, 35 register when the valve is opened and do not register when it is closed.

To this end, the flange 22 on the movable member *b* is provided with a lug 37 and the stationary member *a* is provided at its outer end with a cutaway portion, 38, extending for substantially a quarter of its circumference as shown in Fig. 3, and forming a recess into which the lug 37 is extended so as to engage the opposite end walls of said recess when the valve member *b* is in its opened and closed positions.

As represented in Fig. 2, the ports 34 in the movable member *b* register with the ports 35 in the stationary member *a* and the valve is wide open, and in Fig. 3, the valve member *b* is shown as having been given a quarter turn in the direction indicated by the arrow in Fig. 2 so as to close the ports in the member *a*. The valve may be inserted into the tank or vessel in a horizontal position but it is preferred to insert it in a vertical position, and the inner end of the stationary member *a* is preferably provided with a detachable cap or washer 40 which is secured in place by the nut 41 on the stop screw 20.

From the above description, it will be seen that the parts of the valve may be assembled and adjusted in the shop ready for connection with the tank or vessel, and that when connected with said tank, the stop screw 20 which determines the freedom with which the valve can be turned and also allows for expansion under heat, is not accessible to persons outside the tank, and consequently the valve is not liable to derangement by unauthorized persons.

The valve herein shown is especially adapted for use with tanks containing asphalt or like material which is fluid when hot and solid or semi-solid when cold, inasmuch as the hot asphalt can flow freely from the tank into the movable member *b* and out therefrom in a straight path through the axially arranged outlet mouth of the same, which affords full opportunity for the asphalt or like material to flow out of the hollow valve member *b* and prevents clogging up the same when the valve is closed.

Furthermore, it will be seen that the axially arranged outlet mouth of the valve member *b* affords opportunity for the free entrance of a knife or other suitable tool, with which any solid material adhering to the walls of the member *b* may be removed without removing the said member from its casing or stationary member *a*. So also the member *b* is readily accessible as it can easily be removed when the nut 24 is removed.

Claims:

1. In a valve, in combination, a casing open at one end and provided with a head at its opposite end and having a bore tapering from its open end toward its closed end, a flange on the outside of said casing near its open end, screw-threads on the outside of said casing on opposite sides of said flange, a movable hollow member open at one end and provided with a head at its opposite end, and having its external surface tapered to fit the tapered bore of said casing, an external flange on said movable member, a nut fitted over the outer end of said movable member and engaging a threaded portion of said casing and having a head to engage the flange on said movable member, a stop carried by said flange and co-operating with said casing to limit rotary movement of said movable member, and a stop extended through the head of said casing and co-operating with the movable member to limit axial movement of the latter into said casing; said movable member having a port and said casing having a port with which the port in the movable member is adapted to register.

2. In a valve, in combination, a casing open at one end and provided with a head at its opposite end and having a bore tapering from its open end toward its closed end and communicating with an enlargement near the said head, a movable hollow member open at one end and provided with a head at its opposite end and having its external surface tapered to fit the tapered bore of said casing, an adjustable stop extended through the head of said casing and co-operating with the movable member to limit axial movement of the latter into said casing, and a nut co-operating with a threaded portion of said casing and with said movable member to retain the latter within said casing, said movable member and said casing having co-operating ports and means for limiting the rotary movement of the hollow member to position the same with the ports in opened and closed positions respectively.

3. In a valve, in combination, a casing open at one end and provided with a head at its opposite end and having a bore tapering from its open end toward its closed end, a movable hollow member having its external surface tapered to fit the tapered bore of said casing and having its outlet mouth axially arranged and located outside of said casing, a flange on said hollow member outside of said casing, a stop carried by said casing and co-operating with the said movable member to limit the axial movement of said member into said casing, and means co-operating with said casing and with said flange to retain the movable member in said casing, said movable member and casing having co-operating ports.

4. In a valve, in combination, a casing open at one end and provided with a head at its opposite end and having an internal bore tapering from the outer end toward said head and provided with an externally threaded portion, a movable hollow member provided with an external tapering surface co-operating with the tapering bore of said casing and projecting beyond the open end of said casing and provided with a flange, a nut co-operating with said flange and with the externally threaded portion of said casing and through which said hollow member is extended, and an adjustable stop carried by said casing and co-operating with said movable member to limit the movement of the latter by said nut, said movable member and said casing having co-operating ports.

In testimony whereof, I have signed my name to this specification.

WILLIAM W. RONEY.